United States Patent [19]
Marino et al.

[11] Patent Number: 5,659,433
[45] Date of Patent: Aug. 19, 1997

[54] ACTUATOR WITH REDUCED LENS TILT ERROR

[75] Inventors: Philip F. Marino, Rochester; Lawrence A. Barnes, Fairport, both of N.Y.

[73] Assignee: Eastman Kodak Company, Rochester, N.Y.

[21] Appl. No.: 655,579

[22] Filed: May 30, 1996

[51] Int. Cl.$^6$ .................................................. G02B 7/02
[52] U.S. Cl. .................................... 359/813; 359/823
[58] Field of Search ...................... 359/813, 823, 359/814, 824; 369/44.14, 44.15

[56] References Cited

U.S. PATENT DOCUMENTS

| | | | |
|---|---|---|---|
| 4,960,321 | 10/1990 | Takahashi | 359/823 |
| 5,128,806 | 7/1992 | Ohno | 359/813 |
| 5,523,891 | 6/1996 | Fujisawa | 359/813 |
| 5,542,606 | 8/1996 | McCaslin | 369/44.15 |
| 5,561,646 | 10/1996 | Shtipelman | 369/44.14 |
| 5,598,397 | 1/1997 | Sim | 369/244 |

Primary Examiner—Georgia Y. Epps
Assistant Examiner—Ricky Mack
Attorney, Agent, or Firm—Raymond L. Owens

[57] ABSTRACT

An optical actuator is disclosed for positioning a lens to focus a laser light on a surface of a member, such as an optical disk, with minimum lens tilt error. The optical actuator includes a lens mount for supporting the lens, a plurality of flexures fixed to the lens mount, and a based spaced from the lens mount. The optical actuator further includes a motor structure for operating the actuator in energized and de-energized states. In the energized state, a force is applied to the lens mount to cause the lens mount to move in a focus direction. In the de-energized state, the flexures relax, causing the lens mount to move substantially in the focus direction. The optical actuator further includes an actuator travel stop disposed relative to the base and the lens mount for supporting the lens mount in a downward direction when the actuator is in the de-energized state, to thereby prevent the flexures from creeping in such a way so as to result in lens tilt.

8 Claims, 2 Drawing Sheets

ACTUATOR WITH REDUCED LENS TILT ERROR

CROSS-REFERENCE TO RELATED APPLICATIONS

Reference is made to commonly assigned U.S. application Ser. No. 08/660,568 filed Jun. 7, 1996 and entitled "Position Sensing for an Optical Recording Actuator" by Phil Marino et al. The disclosure of this related application is incorporated herein by reference.

FIELD OF THE INVENTION

This invention relates to optical actuators, and more particularly to focusing a laser beam on a surface, such as an optical disk, so that lens tilt error is minimized.

BACKGROUND OF THE INVENTION

An optical disk recording and reading device includes a lens which focuses a laser light beam onto an optical disk while the disk is rotating. Focus and/or tracking actuators are used in optical disk recording and reading devices to control the position of the lens relative to the rotating disk. The actuators are necessary because of unavoidable warp of the disks, spindle errors, and other mechanical and optical imperfections.

Both focus and tracking of optical disks must continuously be maintained while the disks are recording and/or reading. Focus is controlled by adjusting the distance between the lens and the disk surface. Tracking is controlled by maintaining the lens at the correct radial position such that a single data track is read or written at a time. The motions of the actuator in the focus and tracking directions are controlled by a servo system.

Current actuators typically have a mechanical suspension system to control the motion of the actuator tangent to the disk, as well as three orthogonal rotations. This suspension system often includes a set of flexures. The flexures are typically designed to have high levels of mechanical damping in order to suppress actuator resonances, and thereby improve the overall functioning of the optical disk recording and reading device. Materials and configurations which have high mechanical damping often have low mechanical stability, i.e., the flexures creep and/or stress relax with time, particularly at elevated temperatures.

Alignment of the optical axis of the lens to the disk (i.e., lens tilt) must be maintained accurately for the system to function properly. The problem with the presently known and utilized optical actuator is that during the de-energized state, with time, the weight of the lens and lens holder causes the flexures to creep until the lens holder is resting on the base of the actuator. This contact, typically at an uncontrolled location, causes a moment on the flexures. This moment causes a torsional creep of the flexures, which results in a tilt motion being introduced to the lens and the lens holder. The lens tilt degrades the performance of the optical system, which consequently degrades the writing and reading reliability of the system.

FIG. 1 shows a prior art optical actuator 10 with a lens 12, a lens mount 14, an actuator base 16, and flexures 18. The flexures 18 are made of a high damping material, for example, viscoelastic plastic such as HYTREL elastomer (trademark of DUPONT). When the actuator 10 is in the de-energized state, the gravity creep with time would cause the lens mount 14 to contact the actuator base 16 at an uncontrolled position. This induces a moment about the x-axis, as shown in FIG. 1, which over time, induce a rotation of the lens mount 14 and the lens 12 about the x-axis. The rotation of the lens mount 14 and the lens 12 introduce an undesirable lens tilt error.

SUMMARY OF THE INVENTION

Accordingly, it is an object of this invention to provide an optical actuator with minimized lens tilt error caused by flexure creep.

It is another object of this invention to provide an optical actuator with improved reliability when the system is subject to extended storage in high temperature conditions.

These objects are achieved by an optical actuator for positioning a lens to focus a laser light beam on a surface of a member, such as an optical disk, with minimum lens tilt error, comprising:

a) a lens mount for supporting the lens;

b) a base spaced from the lens mount;

c) a plurality of flexures fixed to the lens mount and the base;

d) motor means for operating the actuator that is operative in energized and de-energized states, such that in the energized state a force is applied to the lens mount to cause the lens mount to move in a focus direction, and in the de-energized state permits the flexures to relax; and e) an actuator travel stop disposed relative to the base and the lens mount for supporting the lens mount in a downward direction when the actuator is in the de-energized state, to thereby prevent the flexures from creeping in such a way so as to result in lens tilt.

ADVANTAGES

An optical actuator according to this invention provides an optical actuator with minimized lens tilt error by substantially reducing a torsional creep of the flexures when the actuator is subject to extended storage in high temperature conditions.

An optical actuator according to this invention further provides an optical actuator with increased performance because it permits the use of less stable and more highly damped flexure materials.

DETAILED DESCRIPTION OF THE INVENTION

Figure 1:
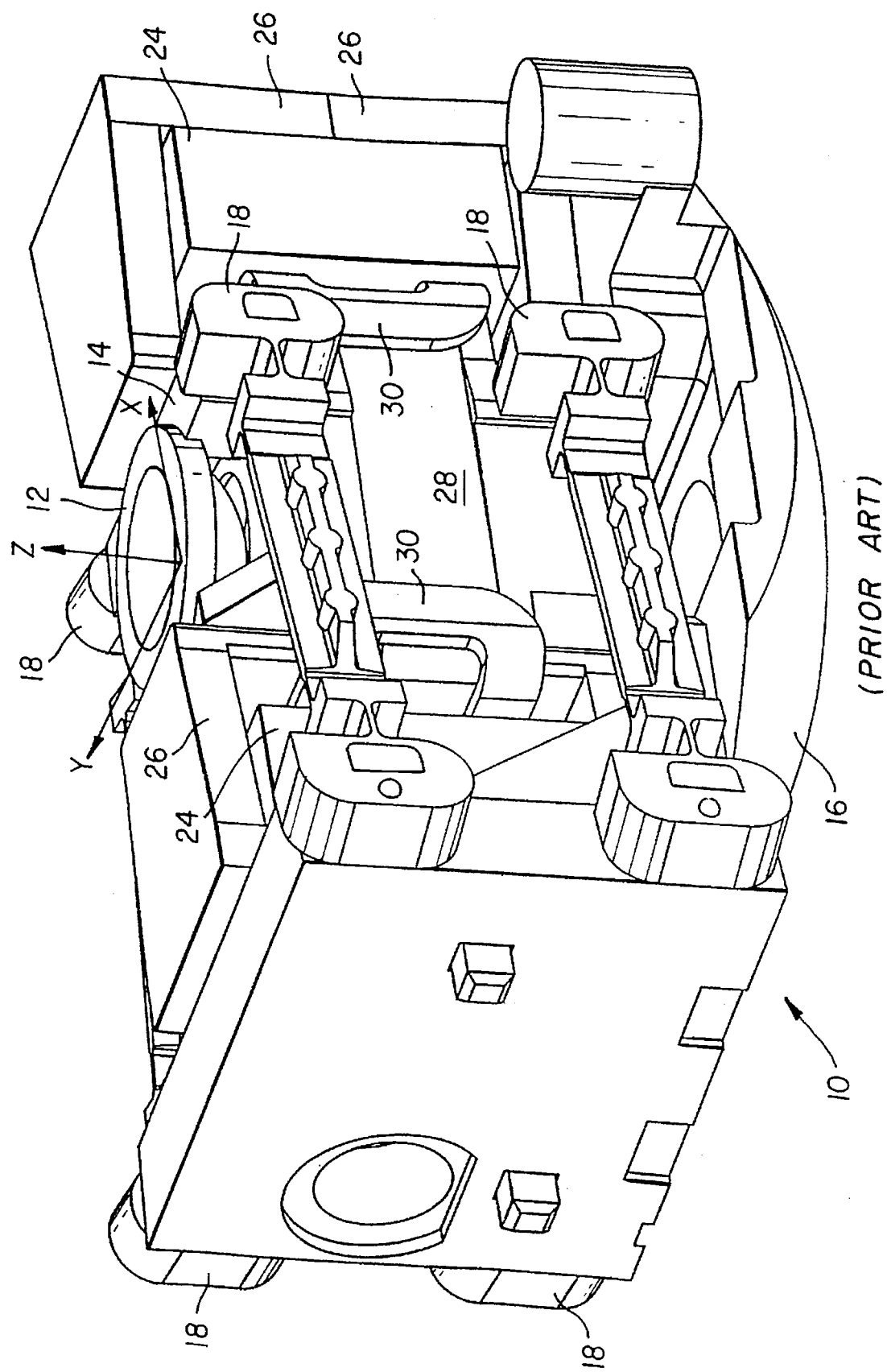
FIG. 1 is a perspective of a prior art optical actuator.
Figure 2:
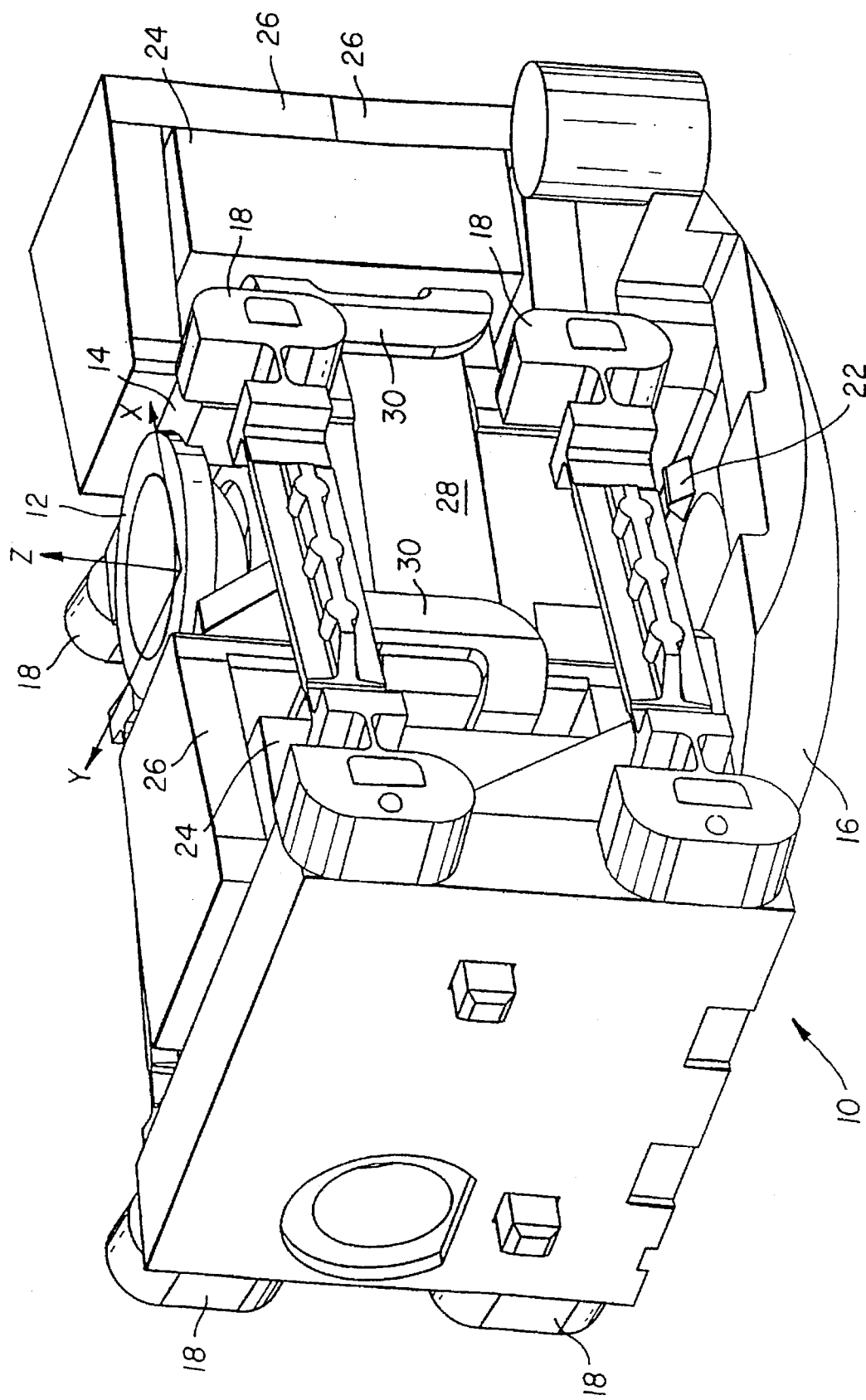
FIG. 2 is a perspective of an optical actuator in accordance with the present invention.

In the following description of FIG. 2, many parts correspond to the parts shown in prior art FIG. 1. Where parts or elements correspond to FIG. 1, the same numerals will be used. No new matter has been added because it is obvious from FIGS. 1 and 2 that many of the parts are identical. Referring to FIG. 2, a perspective of an optical actuator 10 in accordance with this invention is shown. The optical actuator 10 includes the lens 12 which is well known in the art focuses a laser light beam on a surface of a disk member (not shown). Preferably, the disk member is an optical reading and/or recording disk. The lens 12 is fixed to a lens mount 14 by an adhesive or other fastening structure not shown. Preferably, the lens mount 14 is made of a molded plastic, such as VECTRA® (Hoechst Celanese). The optical actuator 10 further includes flexures 18 that are fixed to the lens mount 14 and the actuator base 16. The optical actuator includes at least two spaced-apart flexures 18, which are arranged so that they are substantially parallel when viewed from one side. For a more complete disclosure of flexures 18, see the above-referenced commonly assigned applications.

A conventional motor arrangement is shown which can be used to apply focus force to the lens mount 14. The motor arrangement includes a pair of magnets 24, which are fixed to a pair of magnetic yokes 26. The magnetic yokes 26 are secured to opposite sides of the actuator base 16. The motor arrangement further includes a focus motor coil 28 and four tracking motor coils 30 (only two of which are shown). The focus motor coil 28 is wrapped around its corresponding magnetic yokes 26 and the lens mount 14. Each tracking motor coil 30 is secured to a corner of the focus motor coil 28.

In operation, current is applied to the focus motor coil 28 to create a magnetic field. By energizing the focus motor coil 28, the lens mount 14 moves in a direction along the z-axis. By energizing the tracking motor coils 30, the lens mount 14 moves in a direction along the y-axis.

When both the focus motor coil 28 and the tracking motor coils 30 are de-energized, the gravity creep of a prior optical actuator 10 would cause the lens mount 14 to contact the actuator base 16 at an uncontrolled position. However, in accordance with the present invention, an actuator travel stop 22 is positioned so as to contact and centrally support the weight of the optical actuator 10 when the focus motor coil 28 and the tracking motor coils 30 are in the de-energized state. Preferably, the actuator travel stop 22 is positioned below the center of gravity of the lens mount 14 in the tracking direction. The travel stop 22 is shown as molded directly into the actuator base 16 and can be formed of the same material as the actuator base 16. Alternatively, it can be formed separately from the base. In any event, for purposes of this disclosure, it will be considered to be disposed relative to the actuator base 16. When the optical actuator 10 is subject to extended storage, especially in high temperature conditions, the actuator travel stop 22 will substantially eliminate the moment on the flexures 18 about the x-axis. Elimination of this moment will substantially eliminate the rotational creep of the flexures 18, thereby substantially reducing lens tilt error.

An alternative configuration, with the actuator travel stop 22 molded into the lens mount 14, instead of the actuator base 16, could also be used in accordance with the present invention.

The invention has been described in detail with particular reference to preferred embodiments thereof. However, it will be understood that variations and modifications can be effected within the spirit and scope of the invention.

PARTS LIST

| | |
|---|---|
| 10 | optical actuator |
| 12 | lens |
| 14 | lens mount |
| 16 | actuator base |
| 18 | flexures |
| 22 | actuator travel stop |
| 24 | magnet |
| 26 | magnetic yoke |

-continued

PARTS LIST

| | |
|---|---|
| 28 | focus motor coil |
| 30 | tracking motor coil |

We claim:

1. An optical actuator for positioning a lens to focus a laser light beam on a surface of an optical disk member, with minimum lens tilt error, comprising:

a) a lens mount for supporting the lens;
   b) a base spaced apart from the lens mount;
   c) a plurality of flexures fixed to the lens mount and the base;
   d) motor means for operating the actuator that is operative in energized and de-energized states, such that in the energized state a force is applied to the lens mount to cause the lens mount to move in a focus direction, and in the de-energized state permits the flexures to relax; and
   e) an actuator travel stop disposed relative to the base and the lens mount for supporting the lens mount in a downward direction when the actuator is in the de-energized state, to thereby prevent the flexures from creeping in such a way so as to result in lens tilt.

2. The optical actuator according to claim 1 wherein the actuator travel stop is mounted on the base and positioned below the lens mount center of gravity in a tracking direction.

3. The optical actuator according to claim 1 wherein the actuator travel stop is mounted on the lens mount and positioned below the lens mount center of gravity in a tracking direction.

4. The optical actuator according to claim 1 wherein the actuator travel stop comprises molded plastic material.

5. An optical actuator for positioning a lens to focus a laser light beam on a surface of an optical disk member, with minimum lens tilt error, comprising:

a) a lens mount for supporting the lens;
   b) a base spaced from the lens mount;
   c) at least two spaced-apart flexures, each fixed to the lens mount and the base, the flexures being arranged so that they are substantially parallel when viewed from one side;
   d) motor means for operating the actuator that is operative in energized and de-energized states, such that in the energized state a force is applied to the lens mount to cause the lens mount to move in a focus direction, and in the de-energized state permits the flexures to relax; and
   e) an actuator travel stop disposed relative to the base and the lens mount for supporting the lens mount in a downward direction when the actuator is in the de-energized state, to thereby prevent the flexures from creeping in such a way so as to result in lens tilt.

6. The optical actuator according to claim 5 wherein the actuator travel stop is mounted on the base and positioned below the lens mount center of gravity.

7. The optical actuator according to claim 6 wherein the actuator travel stop is mounted on the lens mount and positioned below the lens mount center of gravity.

8. The optical actuator according to claim 7 wherein the actuator travel stop comprises molded plastic material.

* * * * *